Dec. 27, 1955
C. H. JAMES
2,728,094
MACHINES FOR ASSEMBLING PARTS OF COMPOSITE SHOE SOLES
Filed July 17, 1952
4 Sheets-Sheet 3
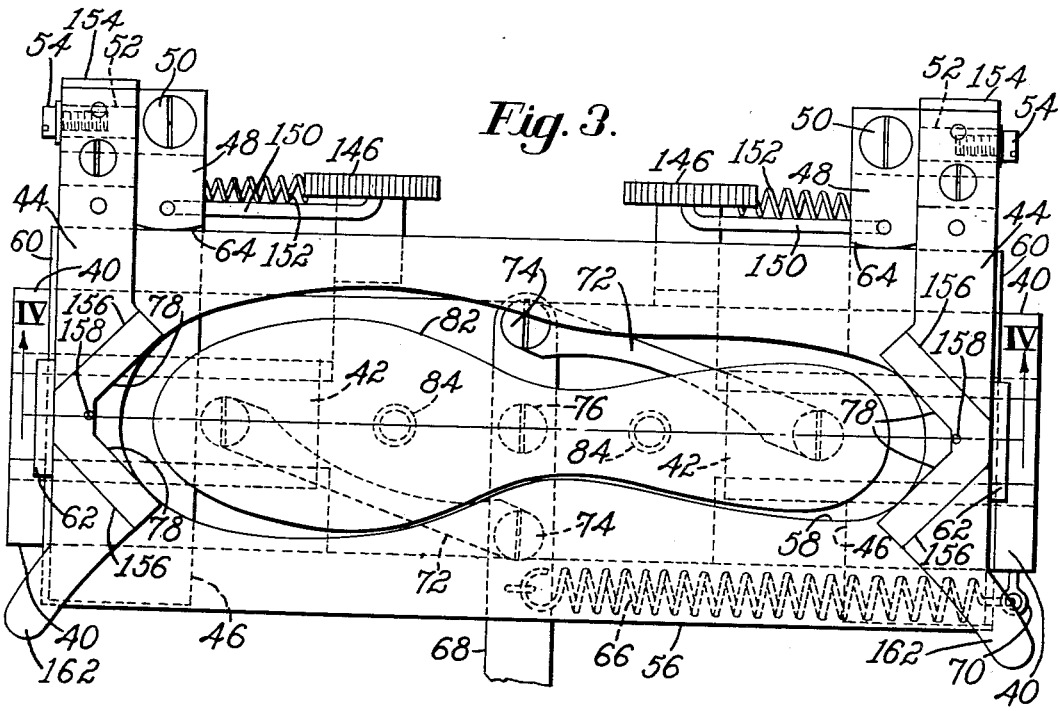
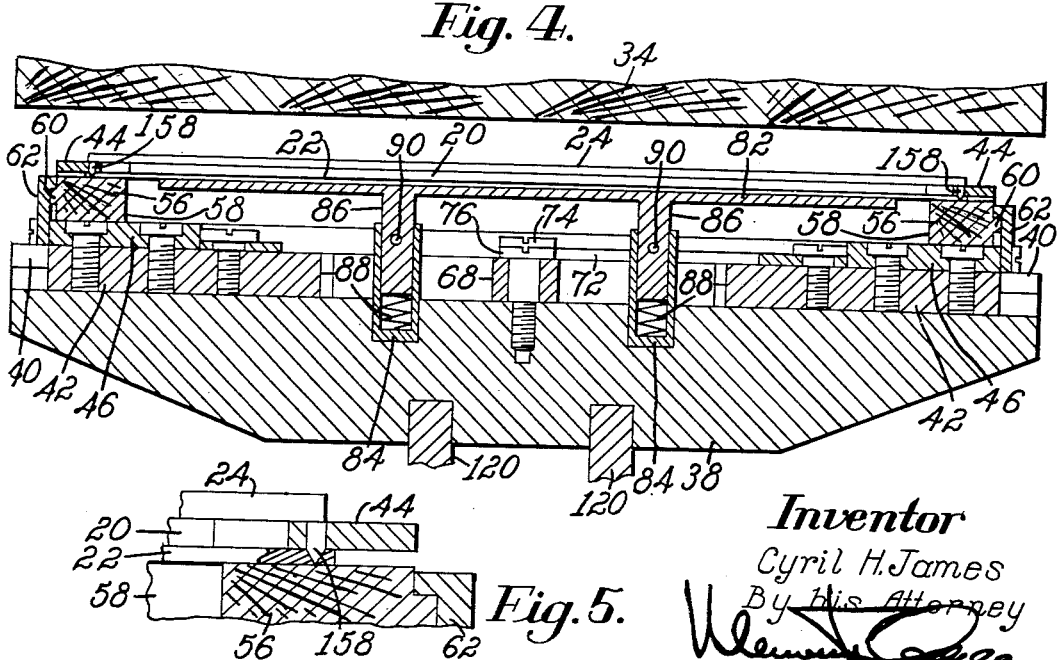
Inventor
Cyril H. James
By his Attorney Inventor
Cyril H. James
By his Attorney

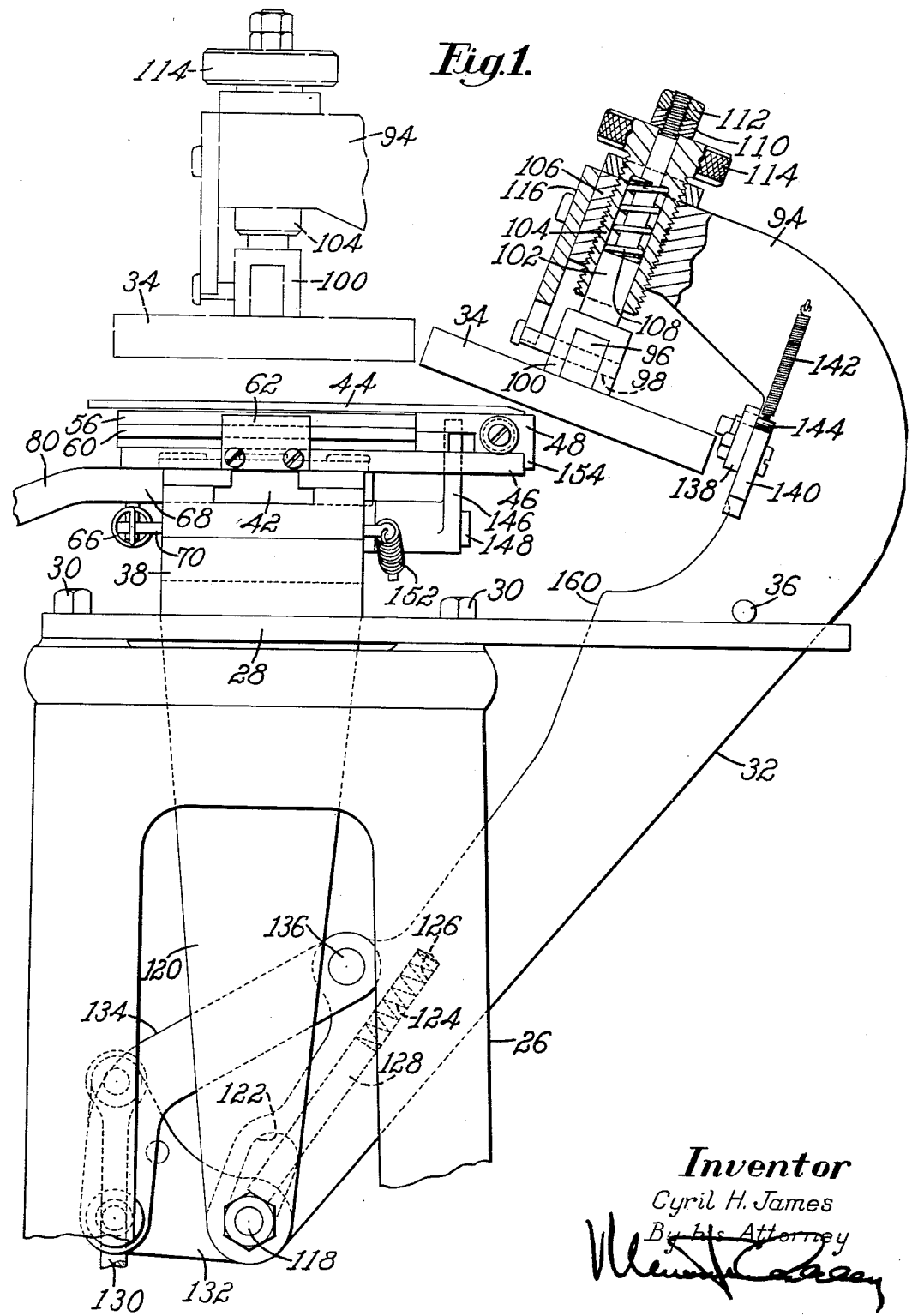

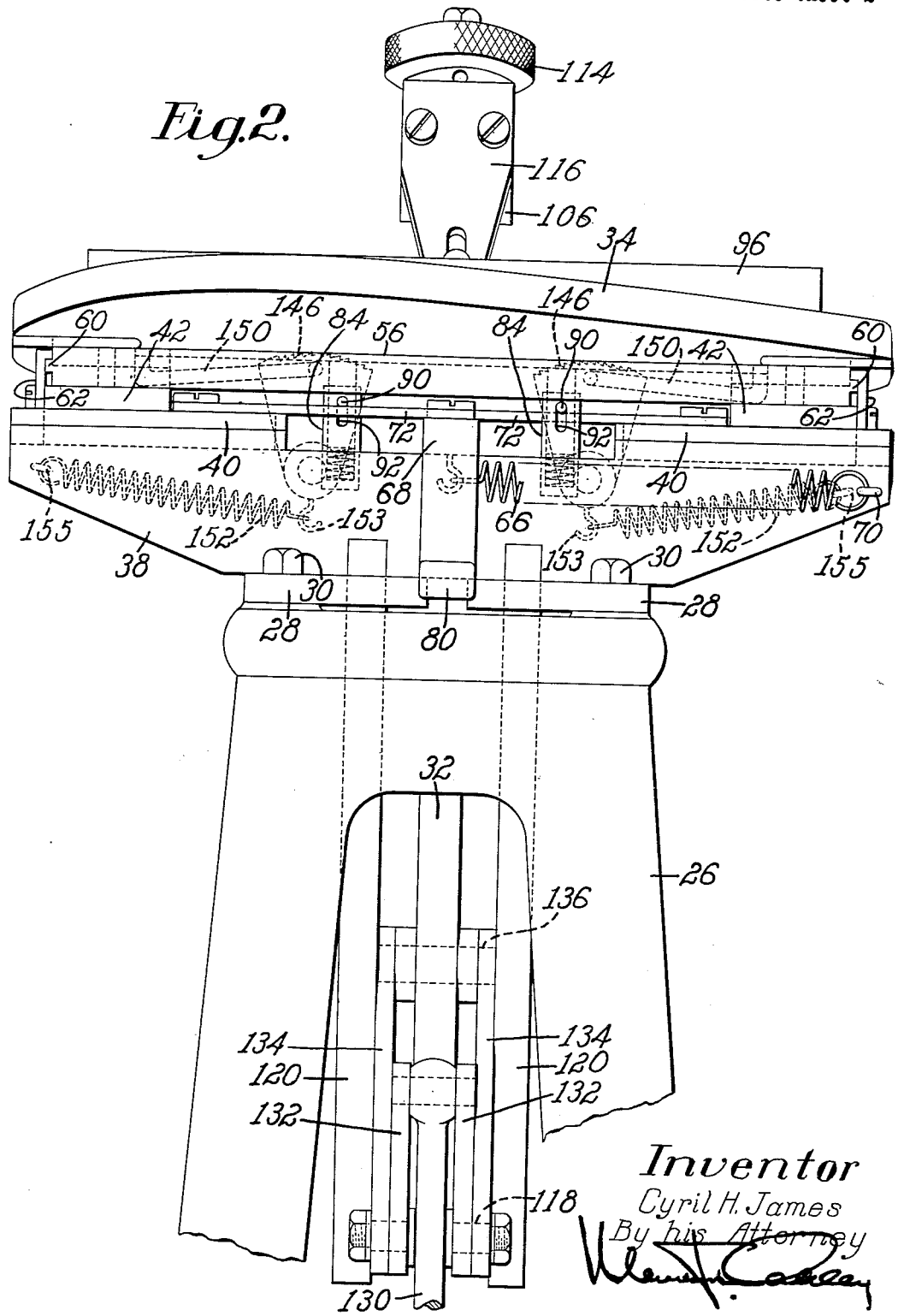

United States Patent Office 2,728,094
Patented Dec. 27, 1955

2,728,094

MACHINES FOR ASSEMBLING PARTS OF COMPOSITE SHOE SOLES

Cyril Harry James, Leicester, England, assignor to United Shoe Machinery Corporation, Flemington, N. J., a corporation of New Jersey Application July 17, 1952, Serial No. 299,405

Claims priority, application Great Britain August 15, 1951

9 Claims. (Cl. 12—17)

This invention relates to machines for assembling shoe parts and is herein illustrated in its application to machines for assembling and pressing together parts of a composite sole. Such machines are adapted to assemble and secure together adhesively a midsole, a filler or cushion sole, and a sock lining to form a composite sole for use in the manufacture of shoes made by the stitchdown process.

It is an object of the present invention to provide a machine in which the parts of a composite sole which have been previously treated with cement for their mutual attachment may be accurately positioned relatively to each other and pressed together in a single operation which may be performed with greater speed, accuracy and effectiveness than the same operation could be performed by hand. It is a further object of the invention to provide a machine in which uniformly accurate and reliable work will be performed without the exercise of special care or skill on the part of the operator.

With the above objects in view the present invention, in one aspect thereof, consists in the provision in a machine for assembling and pressing together parts of a composite sole on a work support and a suitable gage member for use in accurately positioning the parts relatively to each other. The edge gage is mounted on a carrier which moves in a fixture into a position determined by the engagement of the carrier with the work support thereby to locate the gage member in gaging position. The illustrated gage member is characterized by gripping means projecting therefrom and arranged to hold one of the sole parts in gaged position. In the operation of the gage member it is required to swing outwardly from its gaging position, then upwardly, inwardly and downwardly to bring it into gripping position. To provide for such movements of the gage the member mounting the gage is constructed and arranged for angular movement on a first axis in a plane common to a sole part in the machine and the gage itself is mounted on said member for angular movement about a second axis. In accordance with a further feature of the invention the carrier for the two parts comprising the gaging assembly is mounted for adjustment to position the gage member for operation on sole parts of different sizes.

For supporting sole parts to be assembled the illustrated machine is provided with a central support resiliently held against downward movement and a work support for marginal portions of the sole parts. To provide for the operation of the machine on sole assemblies of different sizes, the support for the marginal portions of sole parts is constructed and arranged to be removed and replaced by a support of another size. The gage member and the removable work support are located in predetermined relation to each other in order to position the gage member for operation on sole parts of the size indicated by the work support in the machine.

The illustrated gage member is characterized by a gaging edge face, a gage mark offset from the edge face and a gripping element incorporated in the gage member and arranged to grip a sole member against the work support. In the illustrated organization the edge face gages the position of a filler or cushion sole, and the mark gages the position of a midsole and a sock lining.

These and other features of the invention will now be described with reference to the accompanying drawings and pointed out in the appended claims.

In the drawings:

Fig. 1 is a right side elevation of the upper portion of a machine embodying the present invention;

Fig. 2 is a front elevation of the upper portion of the machine illustrated in Fig. 1;

Fig. 3 is a plan view of the head of the machine;

Fig. 4 is a section on the line IV—IV of Fig. 3, with the work shown on the work supporting members awaiting the operation of the machine.

Fig. 5 is an enlarged view of a portion of the machine head shown in section on the line IV—IV of Fig. 3;

Figure 9:
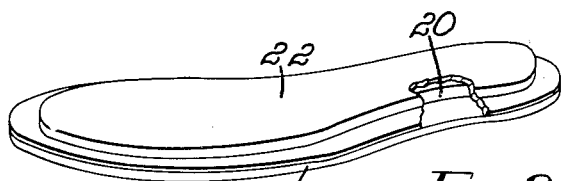
Fig. 9 is a perspective view showing a composite sole unit which has been assembled by the illustrated machine.

The illustrated machine is provided with operating instrumentalities for assembling a composite sole such as that illustrated in Fig. 9 comprising a filler 20 of last bottom shape, a sock lining 22 mounted on the foot facing surface of the filler and having a margin extending beyond the edge face of the filler, and an extension sole or midsole 24 which also has a margin extending beyond the edge face of the filler. Prior to the operation of the machine the mutually contacting surfaces of the three parts comprising the composite sole unit are treated with suitable pressure sensitive cement and are permitted to dry. In the operation of the machine the sock lining 22 is arranged in a predetermined position on the work supports with its cement treated surface uppermost. The filler 20 is then positioned on the sock lining in predetermined relation thereto, and finally the midsole 24 is positioned on the sock lining with its cement treated surface lowermost and is arranged in predetermined relation to the filler and the sock lining. A presser member is then brought to bear against the then uppermost surface of the midsole pressing the work parts together and forcing them downwardly into an opening in a fixed work supporting member, the wall of the opening being so shaped that it causes an intermediate portion of the sock lining to be wiped against the edge face of the filler during the operation of the presser member with sufficient force to cause it to adhere thereto. During the latter part of the operation of the presser member the margin of the midsole is brought into contact with the margin of the sock lining and cement attached thereto to complete the composite sole unit shown in Fig. 9.

Referring to Figs. 1 and 2, the illustrated machine comprises a standard 26 having two crossheads 28 fixed to its upper portion by screws 30. The two crossheads are spaced apart to provide clearance for the operation of a swinging arm 32 which serves as a carrier for a presser member 34. The crossheads 28 are extended rearwardly from the top of the standard to provide a guideway for the arm 32 and to provide means for supporting the arm in its retracted position shown in Fig. 1, are arm being provided with across pin 36 which engages the upper surfaces of the extensions of the crossheads. Fixed to and extending upwardly from the crossheads is a block or bed plate 38 which, as shown in Fig. 2, extends widthwise of the machine. Projecting upwardly from each end portion of the bed plate are spaced bosses 40 which have their inner margins undercut to provide a guideway for two slides 42. As shown in Fig. 3, the guideways are centrally located from front to back of the bed plate and the guideway at the left end of the bed plate is in alinement with the guideway at the right end. Each slide 42 provides a mounting for a gage member 44 and a means for adjusting the gage member in the direction of the length of sole parts mounted on the work supports. To provide for the mounting of the gage member each slide has secured to its upper surface a plate 46 having a rearwardly extending portion which provides a mounting for an arm 48 pivotally mounted on a headed screw 50. The rearwardly extending portion of the gage member 44 is pivotally mounted on a horizontal cylindrical boss 52 extending laterally from the arm 48 and is retained thereon by a headed screw 54 mounted in the boss. The plates 46 also provide supporting means for an outer work supporting member 56 which is freely mounted on the plates and readily removable therefrom to permit its replacement by another work support of a different size. The work support, which is preferably made of wood, is rectangular in shape as shown in Fig. 3 and has a central opening of last bottom shape defined by a vertical wall 58.

For accurately positioning the work support 56 on the plates 46 and retaining it in predetermined position thereon during the operation of the machine, the work support is provided with horizontal tongues 60 extending in opposite directions from its end faces and arranged to be engaged by angular retaining members 62 fixed to the plates 46. The work support is positioned widthwise of sole parts mounted thereon by bringing its rear edge face into engagement with arcuate end faces 64 of the arms 48. In order to hold the work support 56 in its appointed position in the machine the retaining members 62 are pressed against the work support by the action of a spring 66 (Fig. 3) one end of which is anchored to a lever 68 and the other end to a hook 70 fixed in the bed plate 38. The lever is fulcrumed on a screw 76 fixed in the bed plate and is connected to the two slides 42 by two links 72 pivotally mounted on screws 74 fixed to the lever at points on opposite sides of, and equally distant from the screw 76. The spring 66 urges the lever 68 in a counterclockwise direction, as seen in Fig. 3, thus urging the slides 42 toward each other and causing the retaining members 62 to apply pressure to the opposite ends of the work support 56. It will be seen that the engagement of the retaining members with the work support accurately determines the position of the two slides 42 from each other and thus determines the position of each of the gage members 44 relatively to the work support 56. The gage members are so constructed that their gaging edge faces 78 are in tangential relation to the wall 58 of the opening in the work support when the retaining members are in engagement with the opposite ends of the work support, as shown in Fig. 3. The lever 68 is extended forwardly, as shown in Fig. 1, to provide a handle 80 which is conveniently arranged to be manipulated by the operator in order to swing the lever in a clockwise direction, as seen in Fig. 3, thereby to disengage the retaining members 62 from the work support 56 in order to permit the removal of the work support from the machine.

The central work supporting member is a plate 82 which, as shown in Fig. 3, is bilaterally symmetrical and has the general shape of a last bottom. The plate is of such a size that it may move freely vertically within the opening in the work support 56. For mounting the plate 82 two thimbles 84 (Fig. 4) are mounted in vertical sockets in the bed plate 38 and are arranged to receive, for sliding movement therein, two stems 86 extending downwardly from the bottom of the plate. Two springs 88 mounted in the thimbles 84, respectively, urge the work supporting plate 82 upwardly into a position determined by the engagement of pins 90 projecting radially from the stems 86 respectively with the upper end walls of vertical slots 92 (Fig. 2) formed in the thimbles and so constructed an arranged that the pins 90 extend outwardly therethrough.

The presser member 34 is supported by a gooseneck 94 extending forwardly from the upper portion of the arm 32. The presser member, which is preferably made of wood, is secured to a bar 96 mounted on a pin 98 carried by a bifurcated head 100 at the lower end of a stem 102 positioned within a bore in a sleeve 104. The sleeve is externally threaded and is mounted in a threaded bore in a head formed in the end portion of the gooseneck. The upper portion of the stem 102 is reduced in diameter to receive a spring 108 which is confined between the base of the bore in the sleeve and the shoulder at the upper extremity of the lower portion of the stem. The upper portion of the stem extends through a suitable bore in the upper end portion of the sleeve 104 and is threaded at its upper end to receive a locating nut 110 and a locknut 112. The nut 110 is adjusted to determine the pressure of the spring 108 and the sleeve 104 is rotated to provide for adjustment of the presser member 34 toward and from the work. In order to facilitate the adjustment of the presser member the upper portion of the sleeve 104 is provided with a knurled head 114 which is conveniently arranged for manipulation by the operator. In order to hold the presser member 34 against angular movement on the axis of the stem 102 and to determine accurately its orientation, a plate 116 is fixed to the plane end face of the gooseneck 94 and is so arranged that its bifurcated lower end portion engages a forward extension of the pin 98. For mounting the arm 32 a crosspin 118 is fixed in the lower end portions of two parallel vertical plates 120 fixed to and extending downwardly from the bed plate 38. The crosspin extends through a slot 122 formed in the lower end portion of the arm 32. When the machine is at rest, as shown in Fig. 1, the arm 32 is held at the limit of its upward movement relatively to the crosspin 118 by a spring 124 mounted in a bore 126 in the arm 32 and arranged to bear against a plunger 128 mounted in the lower portion of the bore and arranged to bear against the crosspin 118. After the presser member 34 is brought into its position of registration with the work, indicated by broken lines in Fig. 1, it is moved downwardly to apply pressure to the work by the operation of a treadle (not shown) which acts through connections comprising a link 130 pivoted at its upper end to the apex at the upper portion of a triangular lever 132 which is fulcrumed at its lower right apex on the crosspin 118. The triangular lever is connected to the arm 32 by a bent link 134 the lower end of which is fulcrumed at the lower left apex of the triangular lever and the upper end of which is fulcrumed on a pin 136 mounted in a forward extension of the lower portion of the arm 32.

Figure 7:
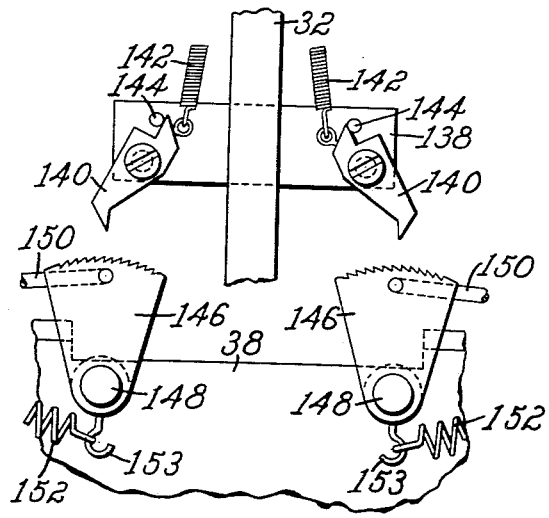
Fig. 7 is a detail view illustrating parts of the gage retracting mechanism.
Figure 8:
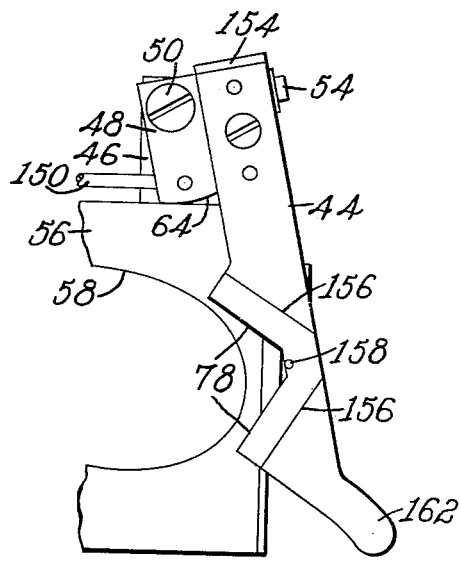
Fig. 8 is a plan view showing one of the gage members in its retracted position.

During the downward movement of the presser member 34 the gage members 44 are swung outwardly into their positions indicated in Fig. 8 to provide clearance for the operation of the presser member. In the illustrated organization, such outward movement of the gage members is effected by the mechanism illustrated in Fig. 7. This mechanism comprises a crossbar 138 fixed to the arm 32 and having fulcrumed at its opposite ends two pawls 140 which are normally held in their positions shown in Fig. 7 by springs 142 which hold the tail portions of the pawls against pins 144 mounted in the crossbar 138. During the downward movement of the arm 32 each pawl 140 engages one of a plurality of ratchet teeth in the arcuate upper portion of a segment 146 fulcrumed on a headed pin 148 mounted in and extending rearwardly from the bed plate 38. Referring to Figs. 2 and 3, each segment is connected to the arm 48 which carries the gage member 44 by a link 150 one end of which is fulcrumed in the upper portion of the segment and the other end in the free end portion of the arm. During the upward or return movement of the presser member 34 each gage member is returned to its normal rest position shown in Fig. 3 by a spring 152 one end of which is anchored to a hook 153 extending downwardly from the hub of the segment 146 and the other end of which is anchored to a hook 155 fixed in the bed plate 38. The normal rest position of each gage member is determined by the engagement of a lug 154 (Fig. 1) projecting downwardly from the rear portion of the arm 48 with the rear end face of the plate 46.

Figure 6:
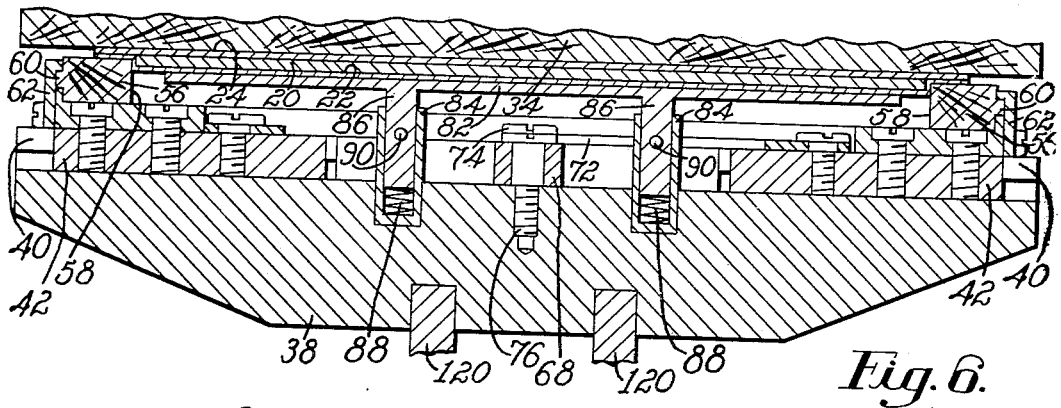
Fig. 6 is a section on the same plane as Fig. 4 showing the work and the operating instrumentalities in their positions at the end of the machine cycle.

In the operation of the illustrated machine the operator lays the sock lining 22 on the central work support 82 with its margin extending over the outer work support 56 along the opposite sides of the sock lining and extending over the gage members 44 at the opposite ends of the sock lining. The sock lining is accurately positioned on the work supporting parts by bringing the edges of its opposite end portions into tangential relation to gage marks 156 (Fig. 3) scribed on the gage members 44. While holding the sock lining in gaged position with one hand the operator with the other hand swings one of the gage members 44 outwardly from beneath the sock lining, then upwardly and finally inwardly over the sock lining. The operator then swings the gage member downwardly onto the upper portion of the margin of the sock lining causing a pointed pin 158 (Fig. 5) to engage the sock lining thus to hold it in adjusted position. The operator then operates the gage member 44 at the opposite end of the sock lining to cause that end of the sock lining to be engaged and held by a similar pin 158 projecting downwardly therefrom. To facilitate the manipulation of the gage members 44 as above described each of said members has a handle 162 extending forwardly and outwardly from its forward extremity, as shown in Fig. 3. After the sock lining 22 has been mounted on the work supports and secured in gaged position by the pins 158, as above described, the operator places the filler 20 on the sock lining in a position determined by the engagement of the edge face at opposite ends of the filler with the gaging edge faces 78 of the gage members 44. The operator then places the midsole 24 on the filler in a position determined by the registration of the opposite end portions of the midsole with the gage marks 156 on the gage members 44. The operator then grasps the knurled head 114 of the sleeve 104 projecting upwardly from the gooseneck 94 and swings the arm 32 forwardly to bring the presser member 34 into its position indicated by broken lines in Fig. 1, this position being determined by the engagement of an abutment surface 160 of the arm 32 with the rear edge face of the bed plate 38. While holding the arm 32 in this position the operator depresses a treadle (not shown) connected to the treadle rod 130 thereby moving the arm 32 downwardly and bringing the presser member 34 into engagement with the upper surface of the midsole 24. During the downward movement of the arm 32 the gage members 44 are retracted into their positions indicated in Fig. 8 to provide clearance for the downward movement of the midsole 24 into its position shown in Fig. 6. The pins 158 which grip the sock lining move outwardly with the gage members and are thus forcibly extracted from the margin of the sock lining. Any rupture which may thus be caused to the margin of the sock lining is inconsequential since this portion of the sock lining is ultimately trimmed off in the manufacture of the shoe. Further downward movement of the presser member 34 after the gage members have been withdrawn moves the sole parts downwardly from their position in Fig. 4 to their position illustrated in Fig. 6. During such downward movement the central work support 82 moves downwardly against the springs 88 while the outer work support 56 remains stationary. The relative movement of the sole parts and the outer work supporting member 56 causes a portion of the sock lining to be wiped upwardly against the edge face of the filler by its contact with the inner surface 58 of the work supporting member 56 and at the end of the downward movement of the presser member 34 causes the margin of the midsole 24 to be pressed against the margin of the sock lining with sufficient pressure to cause them to be cemented together to complete the formation of the composite sole unit illustrated in Fig. 9. During the final stage of the downward movement of the presser member 34 the full force of the downward movement of the treadle is transmitted through the presser member to the marginal portions of the midsole and the sock lining supported by the outer work support 56 since the sleeve 104 at this time is in engagement with the head 100. The connections between the treadle and the arm 32, namely, the triangular lever 132 and the link 134 are so constructed and arranged that a toggle-like action is effected thereby, this action being characterized by a greatly increased leverage from the treadle to the arm 32 during the latter part of the downward movement of the arm thus causing the application of relatively heavy pressure to the margin of the midsole during the final stage of the downward movement of the presser member 34.

Upon the completion of the downward movement of the presser member the operator releases the treadle and the treadle is moved upwardly by a spring (not shown), thus permitting the arm 32 to be moved upwardly by the spring 124 in the lower part of the arm and permitting the arm to swing rearwardly by gravity into its rest position shown in Fig. 1. During the upward movement of the arm the central work supporting member 82 moves upwardly into its rest position shown in Fig. 4 and the gage members 44 are swung inwardly by the springs 152 to their respective rest positions shown in Fig. 3.

Having thus described my invention, what I claim as new and desire to secure by Letters Patent of the United States is:

1. In a machine for assembling shoe parts, an edge gage characterized by the provision therein of an edge face for gaging the position of one work piece and a mark offset from the edge face for gaging the position of another work piece, a carrier on which the edge gage is mounted for angular movement on an axis offset laterally from shoe parts in the machine, and a fixture in which the carrier is mounted for rectilinear movement.

2. In a machine for assembling shoe parts, the combination with a work support of an edge gage, a carrier on which the edge gage is mounted for angular movement, and a fixture in which the carrier is mounted for movement to and from a position determined by the engagement of the carrier with the work support.

3. In a machine for assembling parts of a composite sole, two gage members constructed and arranged to engage opposite end portions of sole parts mounted in the machine, carriers for the gage members, respectively, a work support mounted in the machine and arranged for adjustment lengthwise of the sole parts, and a fixture in which the carriers are mounted for movement toward each other to engage the work support and to position it lengthwise of the sole parts.

4. In a machine for assembling parts of a composite sole, two gage members constructed and arranged to engage opposite end portions of sole parts mounted in the machine, carriers for the gage members, respectively, a work support mounted in the machine and arranged for adjustment lengthwise of the sole parts, and a fixture in which the carriers are mounted for movement toward each other to engage the work support and to position it lengthwise of the sole parts and thus to position the gage members lengthwise of the sole parts.

5. In a machine for assembling together parts of a composite sole, a work support and a gage member characterized first by a mark thereon for gaging the position of one sole member, second by an edge face for gaging the position of another sole member, and third by a gripping element for gripping a sole member against the work support.

6. In a machine for assembling together parts of a composite sole, the combination with a work support, of a gage member characterized by a pin projecting therefrom and arranged to grip a sole member against the work support and characterized further by a mark thereon for gaging the position of one sole member and an edge face for gaging the position of another sole member.

7. In a machine for assembling together parts of a composite sole, a gage member characterized by the provision therein of an edge face for gaging the position of one work member and a mark for gaging the position of another work member and characterized further by a work engaging member carried by the gage member and offset outwardly from its gaging edge face and offset inwardly from the gaging mark.

8. In a machine for assembling parts of a composite sole, a gage member characterized by a gripping element projecting therefrom and arranged to engage one of the sole parts thereby to hold it in gaged position, an arm on which the gage member is mounted for angular movement in a direction to cause the gripping element to grip the work, and a fixture on which the arm is mounted for angular movement in a direction common to the plane of the gripped sole part.

9. In a machine for assembling and pressing together parts of a composite sole, a central work support resiliently held against downward movement, a work support for marginal portions of sole parts, means on which the last-mentioned work support is removably mounted, a gage member, and means for positioning the last-mentioned work support and the gage member in a predetermined position in the machine and in predetermined relation to each other.

References Cited in the file of this patent

UNITED STATES PATENTS

| Number | Name | Date |
|---|---|---|
| 337,467 | Whitney | Mar. 9, 1886 |
| 957,598 | Cook, Jr. | May 10, 1910 |
| 1,004,076 | Preble | Sept. 26, 1911 |
| 1,094,809 | Preble | Apr. 28, 1914 |
| 1,139,165 | Cobb | May 11, 1915 |
| 1,712,482 | Barwick | May 14, 1929 |
| 1,761,020 | Maxwell et al. | June 3, 1930 |
| 1,839,199 | Chapin | Jan. 5, 1932 |
| 1,874,532 | Holmgren | Aug. 30, 1932 |
| 2,065,465 | Whelton | Dec. 22, 1936 |
| 2,151,974 | Kennison et al. | Mar. 28, 1939 |
| 2,305,670 | Cantley | Dec. 22, 1942 |
| 2,323,933 | Preble | July 13, 1943 |